United States Patent
Kim

(10) Patent No.: US 11,656,731 B2
(45) Date of Patent: May 23, 2023

(54) TOUCH SCREEN IMPLEMENTING LOW POWER CONSUMPTION BY USING INTERRUPT METHOD AND SENSING METHOD USING THE SAME

(71) Applicant: G2TOUCH CO., LTD., Seongnam-si (KR)

(72) Inventor: Hyung Guel Kim, Seongnam-si (KR)

(73) Assignee: G2TOUCH CO., LTD., Seongnam-si (KR)

( * ) Notice: Subject to any disclaimer, the term of this patent is extended or adjusted under 35 U.S.C. 154(b) by 0 days.

(21) Appl. No.: 17/694,521

(22) Filed: Mar. 14, 2022

(65) Prior Publication Data
US 2022/0342510 A1    Oct. 27, 2022

(30) Foreign Application Priority Data
Apr. 22, 2021   (KR) .................. 10-2021-0052650

(51) Int. Cl.
  *G06F 3/044*   (2006.01)
  *G06F 3/041*   (2006.01)
(52) U.S. Cl.
  CPC .......... *G06F 3/0446* (2019.05); *G06F 3/0412* (2013.01); *G06F 3/0416* (2013.01)
(58) Field of Classification Search
  CPC .... G06F 3/0446; G06F 3/0445; G06F 3/0443; G06F 3/0412; G06F 3/0416
  See application file for complete search history.

(56) References Cited

U.S. PATENT DOCUMENTS

2021/0173523 A1*  6/2021  Lee ........................... G06F 3/05
2021/0200413 A1*  7/2021  Jang ..................... G06F 3/04166

* cited by examiner

*Primary Examiner* — Robin J Mishler

(57) ABSTRACT

A touch screen according to the present invention senses a touch in an idle mode by using an interrupt method of touch event capturing, not by a method of bottom up or top down polling lines of each row or column, thereby implementing an improved touch response speed and low power consumption.

13 Claims, 4 Drawing Sheets

TOUCH SCREEN IMPLEMENTING LOW POWER CONSUMPTION BY USING INTERRUPT METHOD AND SENSING METHOD USING THE SAME

CROSS-REFERENCE TO RELATED APPLICATIONS

This application claims priority to and the benefit of Korean Patent Application No. 10-2021-0052650 filed in the Korean Intellectual Property Office on Apr. 22, 2021, the entire contents of which are incorporated herein by reference.

TECHNICAL FIELD

The present invention relates to a touch screen, and more particularly, to a touch screen which implements low power consumption by using an interrupt method.

BACKGROUND ART

In general, a touch screen is applicable to various types of electronic devices, such as a navigation device, a netbook computer, a notebook computer, a tablet PC, a Digital Information Device (DID), and an Internet Protocol TV (IPTV), as well as mobile devices, such as a smart phone, a Personal Digital Assistant (PDA), and a Portable Multimedia Player (PMP).

The touch screen may be externally mounted onto upper plates of various types of display, such as a Liquid Crystal Display (LCD), a Plasma Display Panel (PDP), and an Organic Light Emitting Diode (OLED) displays divided into a rigid type, a flexible type, and a foldable type, or may be integrally mounted into the display.

The display to which the touch screen is applied may be variously divided into an add-on type display, an on-cell type display, an in-cell type display, and the like.

For the touch screen, various types of touch methods, such as a resistive film method, a capacitive method, an electromagnetic induction type, an infrared type, or an ultrasonic type, may be applied.

The touch screen to which the capacitive method is applied may detect whether a touch is input and a touch location based on a change in a voltage by touch capacitance (Ct) generated in a touch sensor according to a contact or an approach of a touch input tool, for example, a finger or an electronic pen, to the touch sensor arranged in the touch screen.

The touch screen is generally operated in two modes: (1) active mode in which whether the touch sensor is touched is sensed in a row or column unit by a touch input tool; and (2) idle mode waiting for sensing of the touch sensor.

In the touch screen in the related art, a polling method is maintained in both modes, the active mode and the idle mode. The polling method determines whether a touch is input by periodically sensing the touch sensor of the touch screen.

In particular, in the active mode of the touch screen, the touch sensing is detected by applying a signal of a specific voltage, for example, 120 Hz, and in the idle mode, the state of waiting for the sensing is maintained by applying a signal of, for example, 30 Hz.

In the existing touch screen, even in the idle mode, although the frequency is lower than that in the active mode, a signal of a specific frequency is applied, so that relatively large power consumption is generated.

Therefore, there is a demand for lowering the power consumption in the idle mode to a specific value or less.

PRIOR ART LITERATURE

Patent Document (Patent Document 1) Korean Patent Application No. 10-2016-0113596

SUMMARY OF THE INVENTION

The present invention has been made in an effort to improve a touch response speed of a touch screen and minimize power consumption by sensing a touch in an idle mode by using an interrupt method, such as touch event capturing, not by a method of bottom up or top down polling lines of each row or column.

An exemplary embodiment of the present invention provides a touch screen comprising a plurality of touch sensors, in which the touch screen is operated in an active mode in which a sensing state or a driving state of one or more touch sensors is maintained by a polling method, and an idle mode for waiting for a touch input of the touch sensor, and the idle mode is changed to the active mode by using an interrupt method by touch event capture of at least one touch sensor among the touch sensors.

In the idle mode, the touch screen may consume minimum power.

The interrupt method by the touch event capture may include detecting a voltage change by touch capacitance generated by the one or more touch sensors when there is a touch in the idle mode.

In the idle mode, the touch screen may capture the touch event through a first circuit unit.

The first circuit unit may have detection, comparison, and latch functions.

In the active mode, the touch screen may perform an operation of extracting touch coordinates in the sensing state of the touch sensor through a second circuit unit, or an operation of applying one or more specific voltages to the touch sensor in the driving state.

Another exemplary embodiment of the present invention provides a method of sensing a touch screen including a plurality of touch sensors, the method including: maintaining a sensing state or a driving state of one or more touch sensors by a polling method in an active mode; entering an idle mode when there is no touch input of the touch sensor for a predetermined time; and returning to the active mode by using an interrupt method by touch event capture of one or more touch sensors among the touch sensors.

In the idle mode, the touch screen may consume minimum power.

The interrupt method by the touch event capture may include detecting a voltage change by touch capacitance generated by the one or more touch sensors when there is a touch in the idle mode.

In the idle mode, the touch screen may capture the touch event through a first circuit unit.

The first circuit unit may have detection, comparison, and latch functions.

In the active mode, the touch screen may perform an operation of extracting touch coordinates in the sensing state of the touch sensor through a second circuit unit, or an operation of applying one or more specific voltages to the touch sensor in the driving state.

According to the exemplary embodiment of the present invention, it is possible to implement the touch screen with an improved touch response speed and low power consumption by sensing a touch in an idle mode by using an interrupt method by touch event capturing, not by a method of bottom up or top down polling lines of each row or column.

The touch screen of the present invention may improve performance of touch detection by applying an efficient sequence in an idle mode.

DETAILED DESCRIPTION

Hereinafter, an exemplary embodiment of the present invention will be described in detail with reference to the accompanying drawings and the exemplary embodiment.

A touch screen of the present invention senses whether a touch is input in an idle mode by using an interrupt method by touch event capturing, not by a method of bottom up or top down polling lines of each row or column to have an improved touch response speed and low power consumption.

The present invention adopts the interrupt method for a mode change from an idle mode to an active mode, thereby minimizing power consumption in the idle mode. The interrupt method is a concept in contrast to the polling method discussed above, and in the interrupt method, the touch sensor stands by in a steady state, and when a change in capacitance is captured when an arbitrarily touch event is generated in a plurality of touch sensors, the touch screen is interrupted by an MCU 153 to perform appropriate processing (interrupt service) for a mode change.

Unlike the touch screen in the related art that processes sensing by the polling method in both active mode and idle mode, the touch screen of the present invention does not periodically apply a specific voltage while scanning the touch sensors, but only performs processing of sensing an event capturing signal for a mode change in the idle mode, thereby minimizing power consumption.

The touch screen of the present invention may improve performance of touch detection by applying an efficient sequence in the idle mode.

In the active mode, in order to detect whether the touch sensor is touched, a predetermined DC voltage or a ground (GND) voltage is applied to the touch sensor from the touch drive IC TDI.

In the meantime, in the idle mode (idle state), when there is a touch action by a touch input means, a voltage change by capacitance generated in at least one touch sensor is detected and the mode is changed to the active mode.

The touch screen of the present invention is characterized in that a circuit unit for applying a specific voltage in an active mode and a circuit unit for capturing a specific touch event are separately configured in the idle mode.

Figure 1:
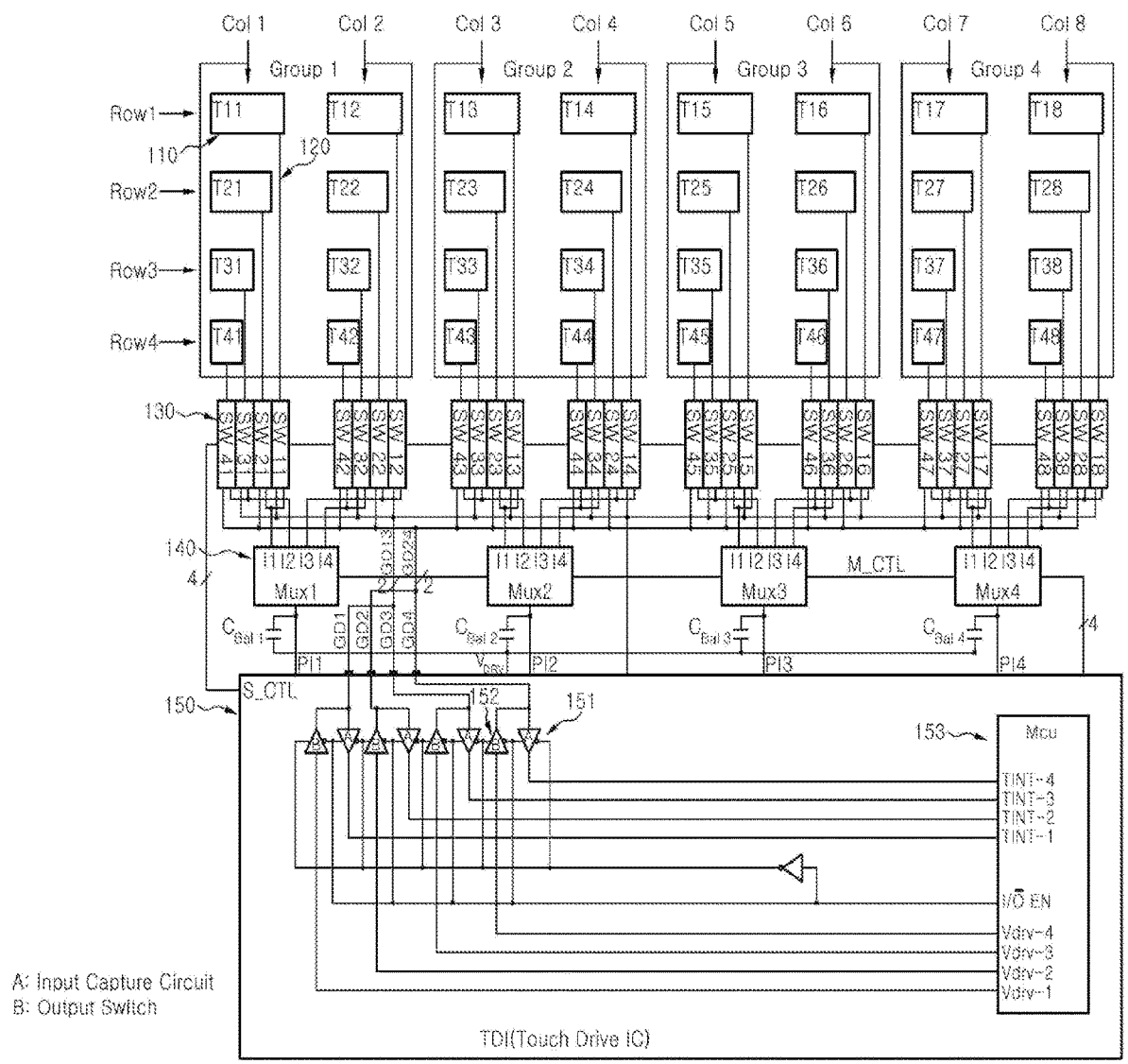
FIG. 1 is a diagram schematically illustrating a configuration of a touch screen and an operating circuit according to an exemplary embodiment of the present invention.

FIG. 1 is a diagram schematically illustrating a configuration of a touch screen and an operating circuit according to an exemplary embodiment of the present invention.

A touch screen 100 of the present invention includes a plurality of touch sensors 110, a plurality of sensor signal lines 120, a plurality of sensor switches 130, a plurality of Muxes 140, and a touch drive IC 150, as illustrated in FIG. 1.

The touch sensor 110 may be arranged, for example, in a matrix form including a plurality of rows and columns, and the sensor signal lines 120 may be independently connected to the touch sensors 110, respectively.

The sensor signal lines 120 may transmit a change in a voltage by touch capacitance Ct generated by the touch sensor 110 to the touch drive IC 150 through the Mux 140, and may be arranged at one side (for example, the right side) of the touch sensors belonging to each column side by side as illustrated in FIG. 1.

The sensor switch SW 130 is turned on/off according to a sensor switch control signal to switch a mode or switch an operation state of the touch sensor.

The sensor switch SW may control a mode change of the touch sensor.

In this sense, the sensor switch SW may also be variously referred to by any other name, such as a state conversion switch (state conversion SW).

The Mux 140 may implement a switching function of controlling the large amount of inputs and outputs, may be formed of the same Thin Film Transistor (TFT) as a TFT used for driving pixels of the display, and may be disposed outside the touch drive IC 150.

For example, the touch drive IC 150 is disposed on a flexible circuit board, such as a Chip On Film (COF) or a Flexible Printed Circuit (FPC).

The Mux 140 may be disposed on a touch screen panel (TSP) that is separate from the flexible circuit board on which the touch drive IC 150 is disposed.

The Mux 140 may be connected to the sensor signal lines of the touch sensors belonging to each column, and may select any one sensor signal line among the sensor signal lines and connect the selected sensor signal line to the touch drive IC 150.

The plurality of Muxes 140 is disposed on the touch screen panel TSP, thereby efficiently reducing the number of input ports of the touch drive IC 150.

For example, as illustrated in FIG. 1, in the case where the number of touch sensors 110 is 32 and the number of Muxes 140 is 4, the number of input ports of the touch drive IC 150 may be 4 which corresponds to the number of Muxes 140.

Among a total of 32 touch sensors arranged in four rows and eight columns, the touch sensors of first and second columns Col 1 and Col 2 may be classified into a first group Group 1, the touch sensors of third and fourth columns Col 3 and Col 4 may be classified into a second group Group2, the touch sensors of fifth and sixth columns Col 5 and Col 6 may be classified into a third group Group3, and the touch sensors of seventh and eighth columns Col 7 and Col 8 may be classified into a fourth group Group4.

A first Mux 1 may be connected with four sensor signal lines connected to the touch sensors of the first to fourth rows Rows 1 to 4 belonging to the first column Col 1 or the second column Col 2, and select any one of the four sensor signals lines and connect the selected sensor signal line to the touch drive IC 150.

A second Mux 2 may be connected with four sensor signal lines connected to the touch sensors of the first to fourth rows Rows 1 to 4 belonging to the third column Col 3 or the fourth column Col 4, and select any one of the four sensor signals lines and connect the selected sensor signal line to the touch drive IC 150.

A third Mux 3 may be connected with four sensor signal lines connected to the touch sensors of the first to fourth rows Rows 1 to 4 belonging to the fifth column Col 5 or the sixth column Col 6, and select any one of the four sensor signals lines and connect the selected sensor signal line to the touch drive IC 150.

A fourth Mux 4 may be connected with four sensor signal lines connected to the touch sensors of the first to fourth rows Rows 1 to 4 belonging to the seventh column Col 7 or the eighth column Col 8, and select any one of the four sensor signals lines and connect the selected sensor signal line to the touch drive IC 150.

The touch drive IC 150 may detect whether a touch is input and a touch location by driving the touch sensors, and receiving the touch capacitance Ct generated by the touch sensors through the sensor signal lines 120 and the Muxes 140.

The touch drive IC 150 controls a switching operation of the Mux 140 and the sensor switch by interlocking the Mux 140 and the sensor switch with each other, and drives the touch sensors 110, receives the touch capacitance Ct generated by the touch sensors through the Muxes 140 and the sensor switches to detect whether a touch is input and the touch location, and may be variously referred to by any other name, such as a touch IC.

The touch drive IC 150 may be interlocked with a Display Drive IC (DDI) included in various types of displays, such as an LCD or an OLED or may be integrated with the DDI to be manufactured as one IC, for example, a Touch Display Drive IC (TDDI), and may be interlocked with a CPU, a MCU, or the like included in various types of electronic devices, such as a smart phone or an inspection device.

The touch drive IC 150 includes circuit unit A 151 controlling an idle mode, circuit unit B 152 controlling an active mode, and an MCU 153.

In the active mode, the touch sensor is operated by four voltages GD1, GD2, GD3, and GD4 directly applied from the touch drive IC TDI.

In particular, the voltage directly applied from the touch drive IC TDI is a programmable voltage and various kinds of voltages may be provided.

Examples of the programmable voltage include a HIGH/LOW DC voltage, square wave, Hi-z (Tri-state), and a programmable driving signal Vdry_x.

When a control signal I/OEN of the MCU 153 of FIG. 1 is set to Low, the programmable driving signal Vdry_X is applied to the touch sensor through the circuit B 152 and the selectively turned-on sensor switch SWxx 130 to implement the active mode.

When the control signal I/OEN of the MCU 153 is first set to High in order
to enter the idle mode, a predetermined pull-up voltage is applied to the touch sensor 110 and the touch sensor enters the idle mode.

Then, when a touch event is generated, a change in a voltage by capacitance generated in one or more touch sensors is input to an interrupt port Tint-x of the MCU 153 within the touch drive IC TDI via circuit unit A (input capture circuit unit) 151. Interrupt service is started with this interrupt signal input, and various operations, such as mode change from the idle mode to the active mode, may be performed.

Figure 2:
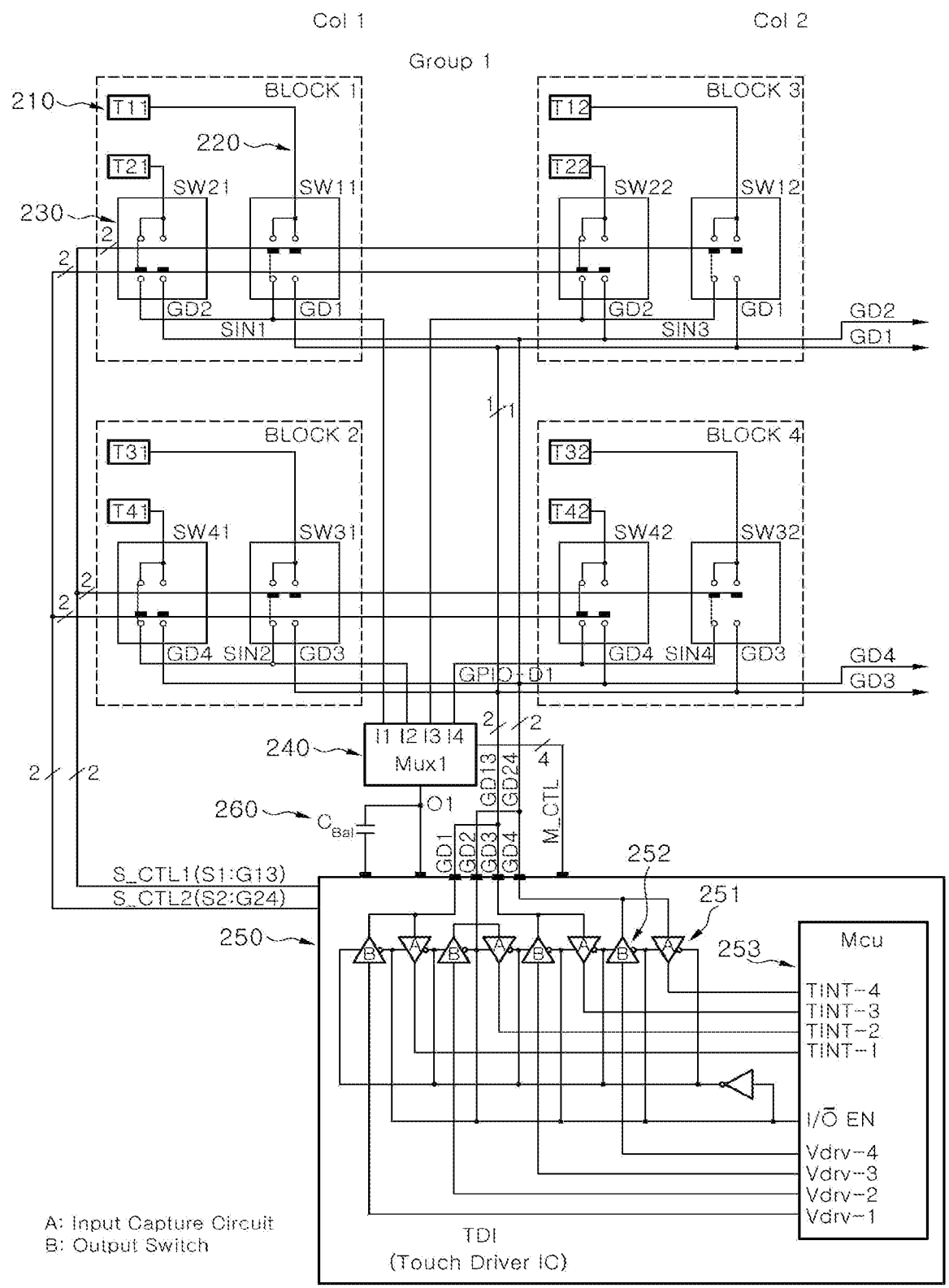
FIG. 2 is a diagram illustrating operations of a sensor, a sensor switch, a Mux, and a touch drive IC TDI for the exemplary embodiment of FIG. 1 in more detail.

FIG. 2 is a diagram illustrating operations of the sensor switch, the Mux, and the touch drive IC TDI for the exemplary embodiment of FIG. 1 in more detail.

FIG. 2 illustrates the operation for the first group of FIG. 1 in more detail, and the first group Group1 of FIG. 2 may be classified into first to fourth blocks Block1 to Block4.

Each of the blocks Block 1 to Block 4 includes two touch sensors (for example, T11 and T21 in Block 1) and two sensor switches (for example, SW11 and SW21 in Block 1).

The Mux Mux1 240 and the sensor switch (for example, SW11) operates so as to enable the connected touch sensor T11 to perform sensing by polling when the mode is in the active mode.

Particularly, the active mode includes a sensing state and a driving state.

The sensing state refers to a state in which a process of extracting accurate coordinates of a touch occurrence based on a voltage change generated in the touch generated in at least one touch sensor is performed.

The driving state refers to a state where a specific voltage is applied to at least one touch sensor (for example, Vdrv generated in the TDI 250, GND, or a specific voltage is applied to the sensor through the ports GD1, GD2, GD3, and GD4 via circuit unit B 252) in order to detect a voltage change of the touch sensor in which the touch is generated.

The touch sensor may detect whether the touch is input by sensing by polling in the sensing state, and may perform an operation of applying a specific voltage by driving by polling in the driving state.

In the idle mode (idle state), the mode change is performed by a method of capturing a touch event passing through all (or a part) of the ports GD1, GD2, GD3, and GD4 and input through circuit unit A of the TDI 250 and interrupting the captured touch event (interrupt by event capturing), without polling for touch detection.

Hereinafter, the sensing of the touch sensor by the polling method in the active mode will be described in more detail.

In the first to fourth blocks Block1 to Block 4, a first switch control signal S_CTL1(S1: G13) and a second switch control signal S_CTL2(S2: G24) are simultaneously applied.

A first sensor switch (for example, SW11) and a second sensor switch (for example, SW21) within each block may cause a first touch sensor and a second touch sensor in the corresponding block to be in different operation states.

For example, the first touch sensors T11, T31, T12, and T32 included in the first to fourth blocks Block1 to Block4, respectively, may be in the sensing state, and simultaneously, the second touch sensors T21, T41, T22, and T42 included in the first to fourth blocks, respectively, may be in the driving state.

In the first Mux Mux 1 240 belonging to the first group, the input ports corresponding to the number of blocks belonging to the first group may be provided.

For example, in the first Mux 240, four input ports I1 to I4 and one output port O1 may be provided.

Four Mux control signals M_CTL interlocked with the control signals S_CTL1(S1:G13), S_CTL2(S2:G24) of the sensor switches SW11 and SW21 may be applied.

For example, the sensors are divided into upper and lower parts and are operated in the first to fourth blocks Block1 to Block4, and when the four upper touch sensors (for example, T11, T12, T31, and T32) are selected based on the control signal S_CTL1(S1:G13) of the sensor switch (for example, SW11, SW12, SW31, and SW32), the Mux control signal M_CTL sequentially selects and senses the four upper touch sensors one by one.

In the meantime, when the four lower touch sensors (for example, T21, T22, T41, and T42) are selected based on the control signal S_CTL2(S2:G24) of the sensor switch (for example, SW21, SW22, SW41, and SW42), the Mux control signal M_CTL sequentially selects and senses the four lower touch sensors one by one.

The Mux and the sensor switch may be disposed outside the touch drive IC as described above, and may be formed on a substrate around the touch screen panel.

Figure 3:
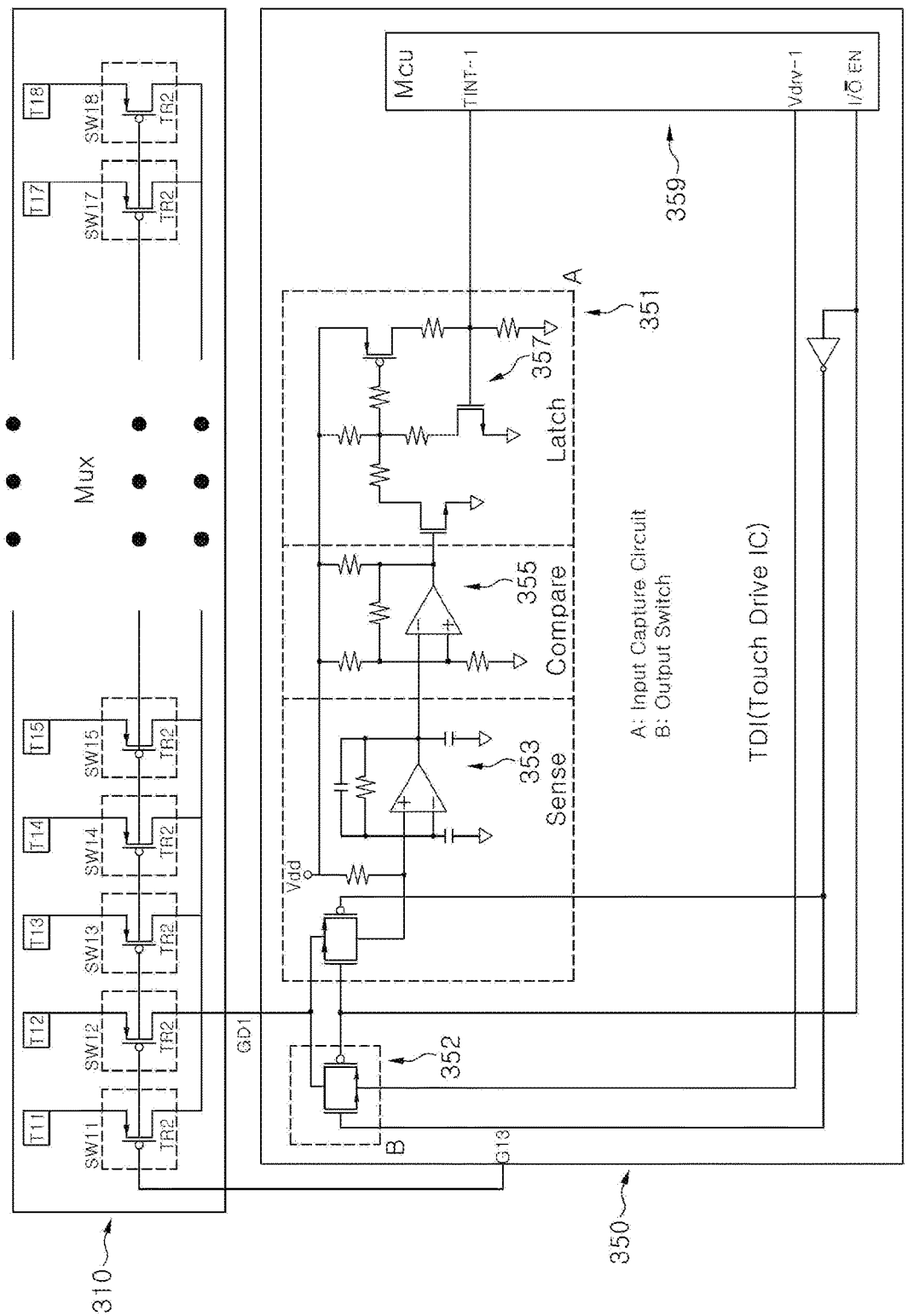
FIG. 3 is a diagram illustrating an operation of the drive IC (TDI) in an active mode or an idle mode for the exemplary embodiment of FIG. 1 in more detail.

FIG. 3 is a diagram illustrating the active mode and the idle mode for the exemplary embodiment of FIG. 1 in more detail.

The sensors and switches 310 of FIG. 3 are located in a first row of first to fourth blocks Block 1 to Block 4 and are connected to a port GD1 of a touch drive IC TDI 350, and are divided into the active mode and the idle mode and used identically to the exemplary embodiment of FIGS. 1 and 2.

In the active mode, touch sensing and driving of the touch sensor are performed, and in the idle mode, sensing for event capturing is performed.

FIG. 3 is a detailed circuit diagram illustrating the state where the plurality of sensors disposed in one row is connected with each other through sensor switches SWxx and Muxes and is output or input to the port GD1 of the touch drive IC TDI 350 according to the mode and operated.

In the active mode, the touch sensing and the sensor driving are performed by driving by polling for each row.

Therefore, in the active mode, Vdrv generated in the TDI 350, GND, or a specific voltage is applied to the sensor through the port GD1 via circuit B 352.

In the meantime, in the idle mode, without polling the touch sensing, a touch event signal input through circuit unit A 351 of the TDI 350 through all (or a part) of the ports GD1, GD2, GD3, and GD4 is captured and whether a touch is input is detected, and then an interrupt for switching the mode to the active mode is generated, like the example of FIG. 2.

The event capturing method or the mode change in the idle mode is a separate process that is distinct from the sensing operation for detecting touch coordinates or whether the touch sensor is touched in the active mode.

In order to capture a touch event in the idle mode, when the port G13 of an MCU 359 within the touch drive IC TDI 350 is set to low and the port I/OEN is set to high, all of the TR2 of switches SW11 to SW18 of the sensor and switches 310 of FIG. 3 are turned on, and a pull up voltage Vdd of circuit unit A 351 charges the touch sensor and the sensor unit 353 (sense) through the switches and waits, and when a predetermined touch event is input, an output of the sensor unit 353 is input to a comparing unit 355 (compare), and when a value of the input signal is equal to or larger than a predetermined value, an output of the comparing unit 355 is generated and is input to a latch unit 357 (latch) to be latched. Then, an output of the latch unit 357 is input to a port TINT-1 of the MCU 359 and the MCU 359 is interrupted.

When the port TINT-1 of the MCU 359 within the touch drive IC 350 is set to
OEN is set to output high, the mode enters the idle mode, when the touch event signal is input to circuit unit A 351 and an output of circuit unit A 351 is input to the port TINT-1 of the MCU 359 within the TDI 350, the interrupt is initiated, so that appropriate processing (interrupt service) for the mode change is performed and the service is terminated, and the mode enters the active mode again by activating circuit unit B 352 by setting port I/OEN to low.

Figure 4:
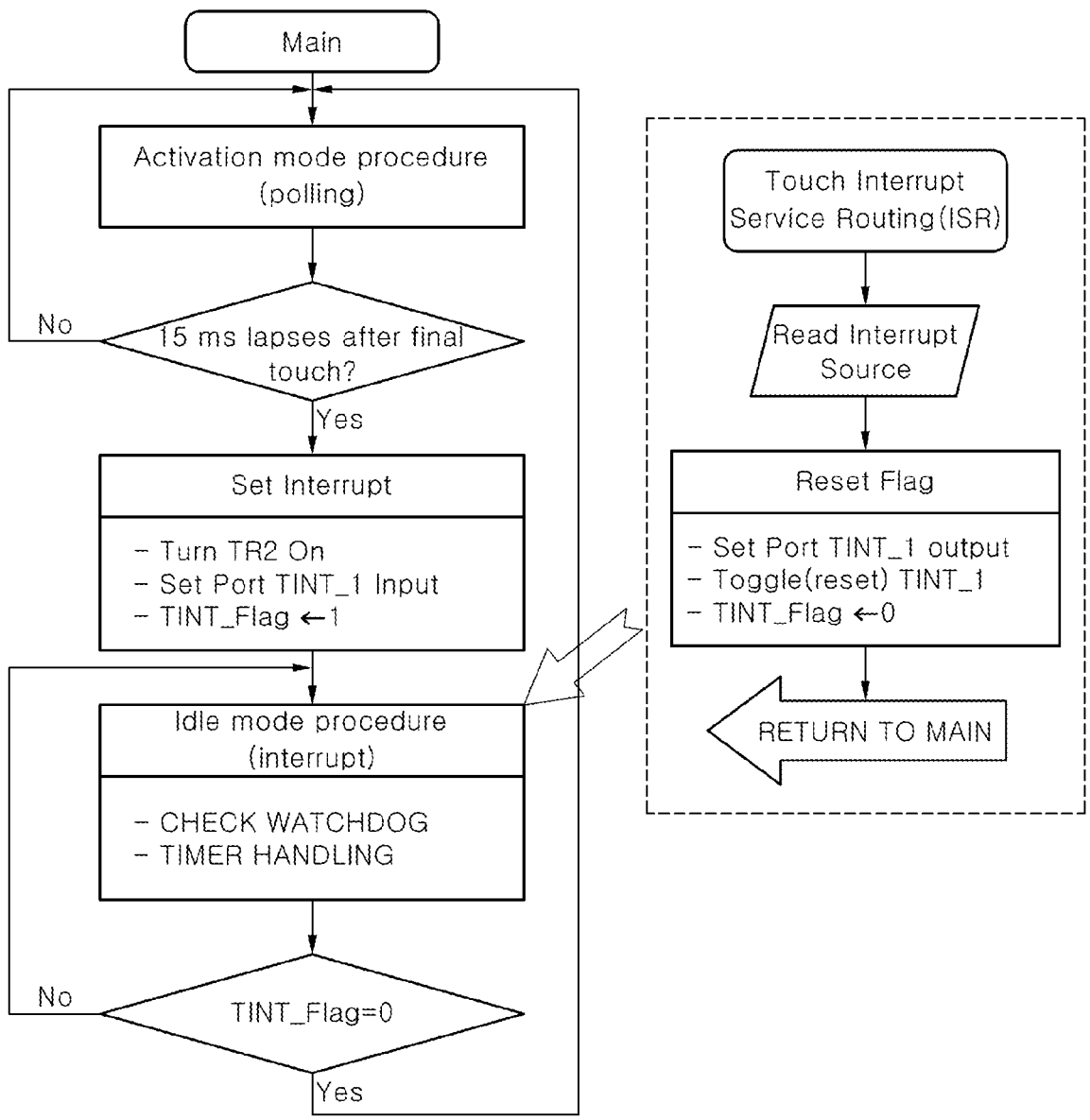
FIG. 4 is a flow diagram when a mode of a touch screen is changed according to the exemplary embodiment of the present invention.

FIG. 4 is a flow diagram when a mode of a touch screen is changed according to the exemplary embodiment of the present invention.

FIG. 4 executes a sensing state or a driving state in a polling method in the active mode according to the exemplary embodiments of FIGS. 1 and 2, and FIG. 3.

Although not limited in the active mode, for example, when there is no touch input for 15 milliseconds (mS), the touch sensor enters the idle mode.

According to the set interrupt condition, the interrupt service is executed in the corresponding interrupt vector by the touch input TINT_x, and when the condition meets the set condition, the touch sensor returns to the active mode.

The touch screen disclosed in the present invention senses whether a touch is input in the idle mode by the interrupt method of capturing a touch event, not by bottom up or top down polling scanning lines of each row or column, thereby remarkably improving a touch response speed and reducing power consumption.

Each of the exemplary embodiments of the present invention described above may be implemented individually, or may be combined with each other and implemented in combination. The present invention described above is not limited by the foregoing exemplary embodiment and the accompanying drawings, and may be variously substituted, transformed, and changed within the scope without departing from the technical spirit of the present invention. This will be apparent to those skilled in the art.

What is claimed is:
1. A touch screen comprising:
a plurality of touch sensors, wherein the touch screen is operated in an active mode in which a sensing state or a driving state of one or more touch sensors is maintained by a polling method, and an idle mode for waiting for a touch input of the touch sensor without polling touch sensing, and the idle mode is changed to the active mode by using an interrupt method by touch event capture of at least one touch sensor among the touch sensors;
a plurality of switches configured to be turned on in the idle mode; and
a drive circuit configured to provide a pull up voltage to charge the touch sensors through the switches and wait without periodically applying a signal of a specific frequency in the idle mode.
2. The touch screen of claim 1, wherein in the idle mode, the touch screen consumes minimum power.
3. The touch screen of claim 1, wherein the interrupt method by the touch event capture includes detecting a voltage change by touch capacitance generated by the one or more touch sensors when there is a touch in the idle mode.
4. The touch screen of claim 1, wherein in the idle mode, the touch screen captures the touch event through a first circuit unit.
5. The touch screen of claim 4, wherein the first circuit unit has detection, comparison, and latch functions.
6. The touch screen of claim 4, wherein in the active mode, the touch screen performs an operation of extracting touch coordinates in the sensing state of the touch sensor through a second circuit unit, or an operation of applying one or more specific voltages to the touch sensor in the driving state.
7. A method of sensing a touch screen including a plurality of touch sensors, the method comprising:

maintaining a sensing state or a driving state of one or more touch sensors by a polling method in an active mode;

entering an idle mode when there is no touch input of the touch sensor for a predetermined time and, in the idle mode, waiting for a touch input of the touch sensor without polling touch sensing; and returning to the active mode by using an interrupt method by touch event capture of one or more touch sensors among the touch sensors, wherein the touch screen further comprises:

a plurality of switches configured to be turned on in the idle mode; and a drive circuit configured to provide a pull up voltage to charge the touch sensors through the switches and wait without periodically applying a signal of a specific frequency in the idle mode.

8. The method of claim 7, wherein in the idle mode, the touch screen consumes minimum power.

9. The method of claim 7, wherein the interrupt method by the touch event capture includes detecting a voltage change by touch capacitance generated by the one or more touch sensors when there is a touch in the idle mode.

10. The method of claim 7, wherein in the idle mode, the touch screen captures the touch event through a first circuit unit.

11. The method of claim 10, wherein the first circuit unit has detection, comparison, and latch functions.

12. The method of claim 10, wherein in the active mode, the touch screen performs an operation of extracting touch coordinates in the sensing state of the touch sensor through a second circuit unit, or an operation of applying one or more specific voltages to the touch sensor in the driving state.

13. The touch screen of claim 1, wherein, in the idle mode, the drive circuit is further configured to generate an input signal when a predetermined touch event is received, compare a value of the input signal to a predetermined value, and initiate an interrupt to enter the active mode when the value of the input signal is equal to or greater than the predetermined value.

* * * * *